United States Patent
Duckheim et al.

(10) Patent No.: US 11,100,410 B2
(45) Date of Patent: Aug. 24, 2021

(54) DEVICE FOR PROBABILITY FORECASTS, ENERGY TRANSMISSION AND/OR ENERGY DISTRIBUTION NETWORK

(71) Applicants: Mathias Duckheim, Erlangen (DE); Arvid Amthor, Grabfeld OT Nordheim (DE); Markus Reischböck, Erlangen (DE)

(72) Inventors: Mathias Duckheim, Erlangen (DE); Arvid Amthor, Grabfeld OT Nordheim (DE); Markus Reischböck, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1117 days.

(21) Appl. No.: 15/581,286

(22) Filed: Apr. 28, 2017

(65) Prior Publication Data

US 2017/0316325 A1    Nov. 2, 2017

(30) Foreign Application Priority Data

Apr. 29, 2016    (DE) .......................... 102016207454.7

(51) Int. Cl.
| | |
|---|---|
| G06N 5/04 | (2006.01) |
| G06Q 10/04 | (2012.01) |
| H02J 3/06 | (2006.01) |
| G06Q 10/06 | (2012.01) |
| G05B 15/02 | (2006.01) |

(Continued)

(52) U.S. Cl.
CPC ............... *G06N 5/04* (2013.01); *G05B 15/02* (2013.01); *G06Q 10/04* (2013.01);
(Continued)

(58) Field of Classification Search
CPC .......... G06N 5/04; G05B 15/02; G06Q 10/04; G06Q 10/0635; G06Q 50/06; H02J 3/00;
(Continued)

(56) References Cited

U.S. PATENT DOCUMENTS

| | | | | |
|---|---|---|---|---|
| 5,798,939 | A | * | 8/1998 | Ochoa ....................... H02J 3/00 |
| | | | | 700/286 |
| 2010/0179704 | A1 | * | 7/2010 | Ozog ..................... G06Q 50/06 |
| | | | | 700/291 |

(Continued)

OTHER PUBLICATIONS

Fliscounakis et al, "Contingency Raking With Respect to Overloads in Very Large Power Systems Taking Into Account Uncertainty, Preventative, and Corrective Actions", IEEE Transactions on Power Systems, vol. 28, No. 4, Nov. 2013, all pages (Year: 2013).*

(Continued)

*Primary Examiner* — Daniel C Puentes
(74) *Attorney, Agent, or Firm* — Lempia Summerfield Katz LLC (57) ABSTRACT

Systems and methods for probability forecasts and an energy transmission and/or energy distribution network are provided. Operational management may be carried out using a network control system with systematic consideration of forecast uncertainties. The probability of a distribution network being operable in a stable manner (e.g., with N-1 certainty) in a planning period is included. The system includes a forecaster for forecasts for a planning period, a forecast analyzer connected to the forecasts from the at least one forecaster, and elements for further information for outputting estimated forecast uncertainties. The system also includes a stability probability analyzer connected to the forecasts from the at least one forecaster, the estimated forecast uncertainties from the forecast analyzer, and elements for further information for outputting at least one item of information relating to an N-1 stability of the distribution network in the planning period.

12 Claims, 5 Drawing Sheets

(51) Int. Cl.
*H02J 3/00* (2006.01)
*G06Q 50/06* (2012.01)

(52) U.S. Cl.
CPC ............ *G06Q 10/0635* (2013.01); *H02J 3/00* (2013.01); *H02J 3/06* (2013.01); *G06Q 50/06* (2013.01); *H02J 3/003* (2020.01); *H02J 2203/20* (2020.01); *Y02E 60/00* (2013.01); *Y04S 40/20* (2013.01)

(58) Field of Classification Search
CPC .. H02J 3/06; H02J 3/003; Y02E 60/76; Y04S 40/22
See application file for complete search history.

(56) References Cited

U.S. PATENT DOCUMENTS

2011/0202191 A1* 8/2011 Larsson ................. H02J 3/381 700/287

2014/0025352 A1 1/2014 Ghosh et al.
2020/0327411 A1* 10/2020 Shi ....................... G06N 3/0454

OTHER PUBLICATIONS

Fliscounakis et al, "Contingency Ranking With Respect to Overloads in Very Large Power Systems Taking Into Account Uncertainty, Preventive, and Corrective Actions", 2013, IEEE Transactions on Power Systems, vol. 28, No. 4, all pages (Year: 2013).*
German Search Report for related German Application No. 10 2016 207 454.7 dated Dec. 1, 2016, with English Translation.
Anonymous: "CS109 Project—Building Energy Consumption Prediction", XP055370513, Internet: URL:https://web-beta.archive.org/web/20160425115841/http://cs109-energy.github.io/ [May 9, 2017]; sections Motivation and Data Collection; 2016.
European Search Report for related European Application No. 17161999.2 dated Jun. 1, 2017, with English Translation.

* cited by examiner

FIG 1

1) Forecast for planning period:
   production/load/energy flow

2) Past forecast:
   production/load/energy flow

3) Data recorded in the past:
   production/load/energy flow

4) Estimated forecast uncertainty

5) Unpredictability list

6) Maintenance device;
   maintenance duration

DEVICE FOR PROBABILITY FORECASTS, ENERGY TRANSMISSION AND/OR ENERGY DISTRIBUTION NETWORK

CROSS REFERENCE TO RELATED APPLICATIONS

This application claims the benefit of DE 102016207454.7 filed on Apr. 29, 2016, which is hereby incorporated by reference in its entirety.

FIELD

Embodiments relate to a method and device for probability forecasts.

BACKGROUND

For operational planning, for example of maintenance work, in energy transmission and/or energy distribution networks (also referred to as a transmission and/or distribution network) identifying the network states occurring in a planning period is important. Forecasts of power profiles of loads and producers are becoming increasingly important with an increasing number of renewable energy producers also referred to as renewable producers or producers.

In contrast to a distribution network including conventional power plants, the production of energy may no longer be directly controlled in a distribution network dominated by renewable producers and may be forecast on the basis of weather forecasts, for example. The new networks result in uncertainty that may be controlled by using new methods matched to the changed framework conditions.

To reliably plan maintenance work in a distribution network dominated by renewable producers, the forecast supply and load profiles are considered to be future states of the distribution network in which energy is supplied or consumed at the individual network nodes of the distribution network. For the states, whether the distribution network may be operated in a stable manner and whether maintenance work may be carried out in particular network sections is determined. The quality of the power profile forecasts is an important prerequisite for the determinations. Large forecast errors may result in large deviations that may be reacted to dispatch measures, e.g by specifically connecting and disconnecting producers or loads, for example. However, if a line is deactivated on account of maintenance work, the number of countermeasures may be restricted.

A known practice is to compare and or combine forecasts from a plurality of forecast providers. A weighting of the individual forecast is determined by manual plausibility checks of the plurality of forecasts. The weighted combination of the individual forecasts is then assumed to be the final forecast, for example.

A disadvantage is that the combined final forecast retains a poor quality if the individual forecasts are poor. In addition, this solution is a manual procedure, the quality of which is based on the practical knowledge of the corresponding processor.

US 2014/0025352 A1 discloses the use of the "stochastic optimization" for network planning. For optimization, an uncertainty of the future network state is explicitly taken into account in the planning calculation by formulating a stochastic optimization problem for network planning. One difficulty with the "stochastic optimization" approach is the quantitatively realistic determination and modeling of the uncertainty. Although an algorithm for solving the optimum dispatch of different generators is disclosed, the algorithm does not solve the stability and maintenance planning problem efficiently. In addition, the forecast uncertainty is assumed to be known.

SUMMARY AND DESCRIPTION

The scope of the present invention is defined solely by the appended claims and is not affected to any degree by the statements within this summary. The present embodiments may obviate one or more of the drawbacks or limitations in the related art.

Embodiments provide a device for probability forecasts and an energy transmission and/or energy distribution network and a method for operating the network that is optimized so that operational management may be carried out using a network control system with systematic consideration of forecast uncertainties.

In an embodiment, the device includes at least one forecast module (FM) that is connected to data provision devices and provides forecasts for a planning period from the data provided by the data provision devices. The device includes a forecast analysis module (AM) configured to access the forecasts from the at least one forecast module (FM), access to elements for past forecasts, and access to elements for past recorded system data for outputting estimated forecast uncertainties from the data obtained from the connections. The devices includes a stability probability analysis module (PSA) configured to access the forecasts from the at least one forecast module (FM), access to the estimated forecast uncertainties from the forecast analysis module (AM), access to elements in an unpredictability list containing unpredictabilities and access to maintenance devices and elements for information relating to maintenance durations for outputting at least one item of information relating to an N-1 stability in a planning period.

In an embodiment, the system includes a network control system that is connected to the at least one forecast module that is connected to data provision devices. The network control system provides forecasts for a planning period from the data relating to future network states provided by the data provision devices, for changing the energy transmission and/or energy distribution network to a current operating state on the basis thereof by the network control system. A forecast analysis module has access to the forecasts from the at least one forecast module, access to elements for past forecasts and access to elements for past recorded system data for outputting estimated forecast uncertainties from the data obtained from the connections. The system includes a stability probability analysis module with access to the forecasts from the at least one forecast module, access to the estimated forecast uncertainties from the forecast analysis module, access to elements in an unpredictability list containing unpredictabilities and access to network maintenance devices and elements for information relating to maintenance durations for outputting at least one item of information relating to an N-1 stability of the distribution network in a planning period.

In an embodiment, data is provided for forecasting future network states for a planning period for changing the energy transmission and/or energy distribution network to a current operating state on the basis thereof. A forecast analysis is carried out using the forecasts, past forecasts and past recorded system data. Estimated forecast uncertainties are output. A stability probability analysis is carried out using the forecasts, the estimated forecast uncertainties, unpredictabilities and information relating to network maintenance devices and maintenance durations. At least one item of information is output relating to an N-1 stability of the distribution network in a planning period.

The energy transmission and/or energy distribution network provide operational management of the energy transmission and/or energy distribution network according to an embodiment using a network control system with systematic consideration of the forecast uncertainty. The probability of a distribution network to be operated in a stable manner, e.g with N-1 certainty, in the planning time interval is concomitantly included.

In an embodiment, a forecast analysis module and a stability probability analysis module are provided in addition to a forecast module.

Previously, for a combined forecast for planning, an uncertain forecast is incorrectly assumed to be certain. The assumption results in greater planning errors as the forecast is based on a statistical evaluation of past prediction errors.

An embodiment provides the network operator with a new, statistically safeguarded variable that provides uncertain load flows during operational planning. The data available in the control system is used to quantify forecast errors as realistically as possible.

The stability probability analysis module is configured to output information relating to optimum maintenance periods in the distribution network and output information relating to optimum maintenance periods in the distribution network during the stability probability analysis.

In an embodiment, at least weather forecast data is also concomitantly used in the forecast determinations.

Intervals of time in which maintenance work may be reliably carried out may be determined with the highest probability.

An embodiment provides a fully automatic decision support system that, without the intervention of the operator, e.g. a network operator, creates decision proposals on the basis of safeguarded statistical methods and optimally supports the work of the network operator. Embodiments may provide that the quality of the decision proposals has a constantly high level as the proposals are not based on the practical knowledge of individual persons.

The combination of a forecast module, a forecast analysis module and a stability probability analysis module provide for a system to determine all variables needed to determine the stability inside the control system. The stability analysis may be implemented using existing functions available in the control system. Further information relating to the technical features may be gathered.

DETAILED DESCRIPTION

Network controls assist network operators with operational management and operational planning functions. A procedure when planning network measures is based on schedules for producing power by power plants and on forecast power profiles with respect to unpredictable loads and uncontrollable renewable producers. The profiles and schedules stipulate the network state (e.g., the energy flow at each network node). The network operator assesses the stability (e.g., the N-1 robustness) of the distribution network using a special function or stability analysis function.

However, with large errors in the forecast profiles, planning errors that become increasingly greater occur. The errors may be compensated for by holding power reserves and carrying out dispatch measures, which gives rise to additional costs.

Figure 1:
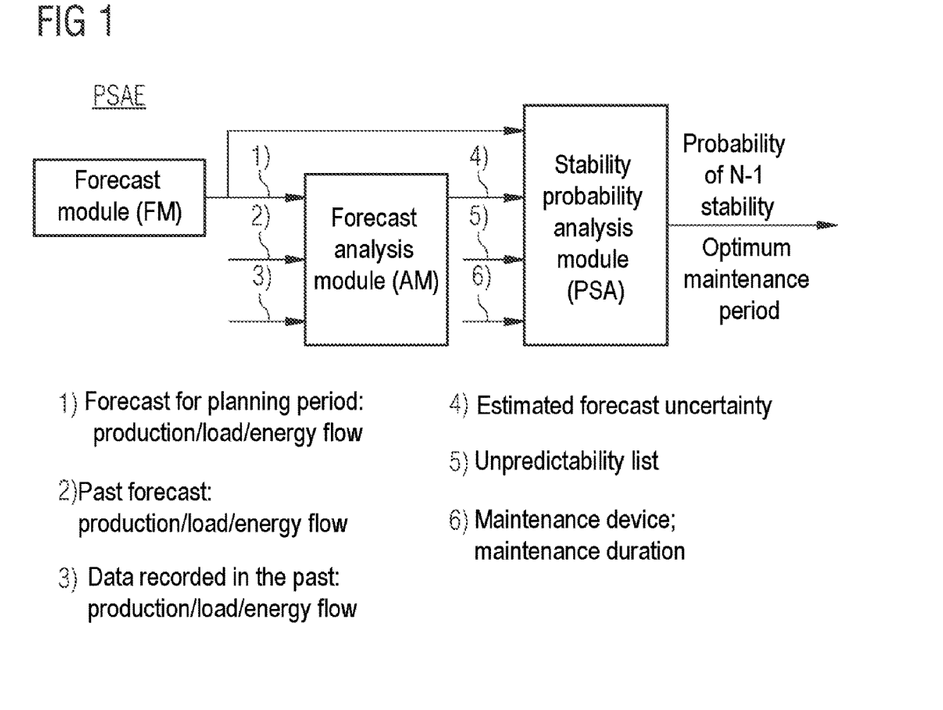
FIG. 1 depicts an example overview of the components for the stability probability analysis.

In an embodiment, a device for probability forecasts PSAE (as depicted in FIG. 1) analyzes past forecasts and data recorded in the past as well as current forecasts (e.g., each relating to powers produced, loads and energy flows) and uses the data to determine a probability of a stable N-1 state (e.g., an N-1 network state) for a planning period. The probability provides a network operator with a measure of how reliable an assessment is with respect to the network stability in the planning period. For example, a probability of more than 90% is acceptable for a stable distribution network. If a probability of below 90% is obtained, schedules for producing energy by power plants may be adapted, or wind farms may be informed of imminent reductions. In addition, an included stability probability analysis module PSA (FIG. 1) may identify the period with the highest probability of a stable network state under maintenance conditions. The probability of N-1 stability is determined for an excluded network state with a maintenance device. The determination assists with the decision regarding when maintenance measures may be carried out.

As depicted in FIG. 1, the device for probability forecasts PSAE includes a forecast module FM, a forecast analysis module AM, and a stability probability analysis module PSA.

The forecast module FM generates forecasts of energy production or energy flows, including uncontrollable loads, at network nodes (not shown in any more detail in the drawing) of a distribution network (not shown in any more detail in the drawing). Such a module may be part of a control component. The forecast is either obtained from an external service provider or from an internal function of the network control device based on past data.

The forecast analysis module AM uses past and recorded data to estimate the uncertainty of the forecast.

The stability probability analysis module PSA uses the data to determine the probability for the distribution network and with respect to N-1 stability of the distribution network. The stability probability analysis module PSA uses the data to determine the period with the highest stability probability under maintenance conditions.

Unpredictabilities that are listed in an unpredictability list and information relating to the devices to be maintained and the devices or installations that are still available and maintenance durations may be used.

Figure 2A:
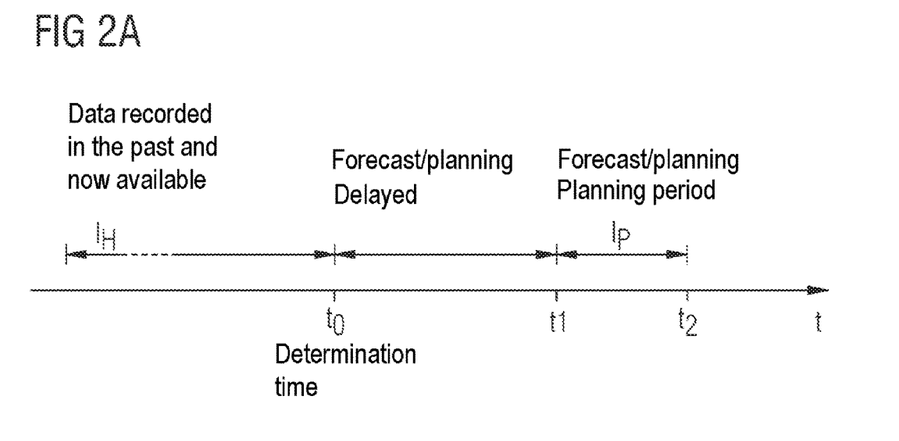
FIG. 2A depicts an example overview of the definition of periods and specific individual times.

FIG. 2A depicts an overview of the notation for the different intervals of time that are important for the device for probability forecasts PSAE. The determination is carried out at a time t0. The period for which the determination is carried out is referred to as the forecast or planning period IP. The period is temporally separated from the time t0 by the planning period. Past data (e.g., recorded energy flows and past forecasts) are recorded and provided in the period IH that precedes the time t0.

Figure 2B:
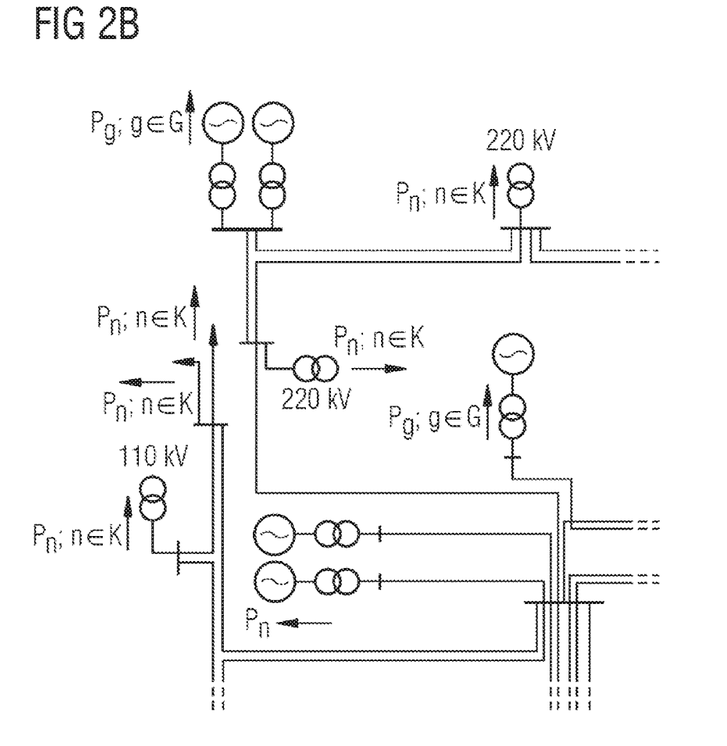
FIG. 2B depicts an example energy transmission and/or energy distribution network with a notation for the energy flow therein.

FIG. 2B depicts the notation for the energy flow at the network nodes of an energy transmission and/or distribution network to other distribution networks. Energy supplies that are marked by thick separate arrows in FIG. 2B are described in the form Pg; g∈G for controllable energy producers and are described in the corresponding form Pn; n∈K for supplies to other distribution networks. The index groups G and K denote groups of producer busbars and network nodes of the distribution network. The agreement of a positive energy flow away from a busbar or a network node may be used. The energy provided by a producer Pg may be negative.

Figure 3A:
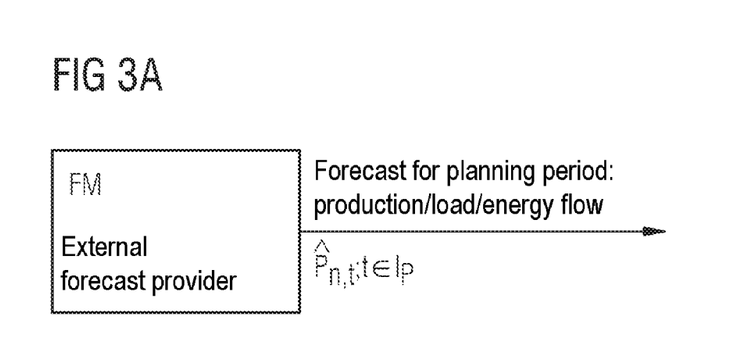
FIG. 3A depicts an embodiment of a forecast module according to FIG. 1 with a forecast from an external forecast provider.

The forecast module FM depicted in FIG. 3A generates a forecast for the energy profile n, t in the planning period IP. FIG. 3A depicts an embodiment of a forecast module FM in which the energy profile n, t is obtained from an external forecast provider. The external forecast provider may consult and use past data. As energy production from renewable energy sources has a large influence on the energy flow in the network nodes of the distribution networks, the external forecast provider also is to concomitantly include weather forecasts.

Figure 3B:
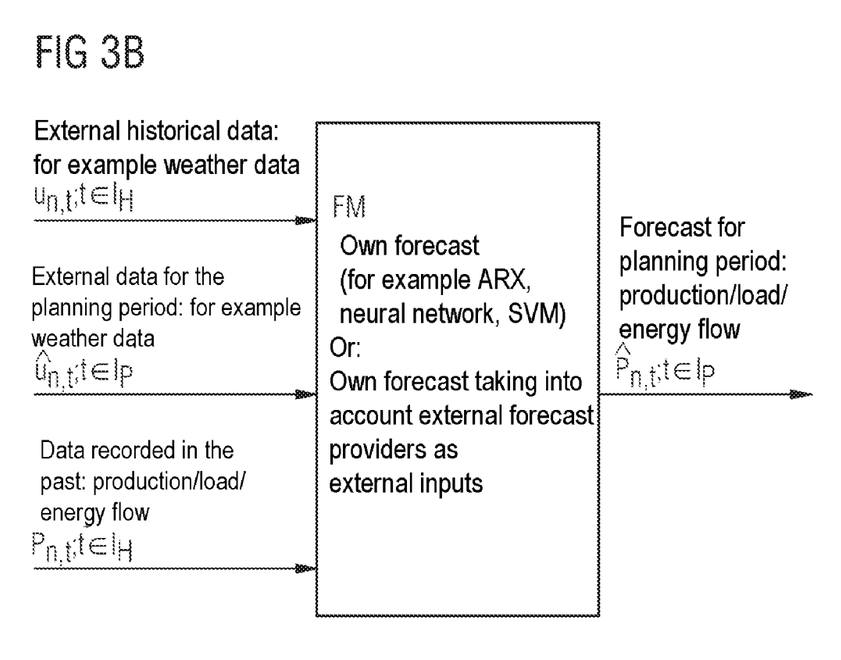
FIG. 3B depicts an embodiment of a forecast module according to FIG. 1 with an integrated forecast.

FIG. 3B depicts an embodiment of a forecast module FM that is integrated in a large system (e.g., a collaborative EMS/DMS/SCADA system (EMS: Energy Management System; DMS: Distribution Management System; SCADA: Supervisory Control and Data Acquisition)) and provides integrated forecasts. The forecast module may include a general processor, digital signal processor, three-dimensional data processor, graphics processing unit, application specific integrated circuit, field programmable gate array, digital circuit, analog circuit, combinations thereof, or other now known or later developed device for forecasting.

FIG. 3B depicts methods for obtaining the forecast, for example, using an autoregressive model with external input data (ARX), artificial neural networks, and support vector machines (SVM). Different types of input are used: energy flows recorded in the past Pn, t; t∈IH at the network nodes of the distribution networks, external past input data (e.g., forecast weather data; forecast data relating to wind speed, direct radiation (DNI: Direct Normal Irradiation), and diffuse radiation (DHI: Diffuse Horizontal Irradiation)), and forecast data relating to temperature and forecast external data for the planning or forecast period.

Figure 4:
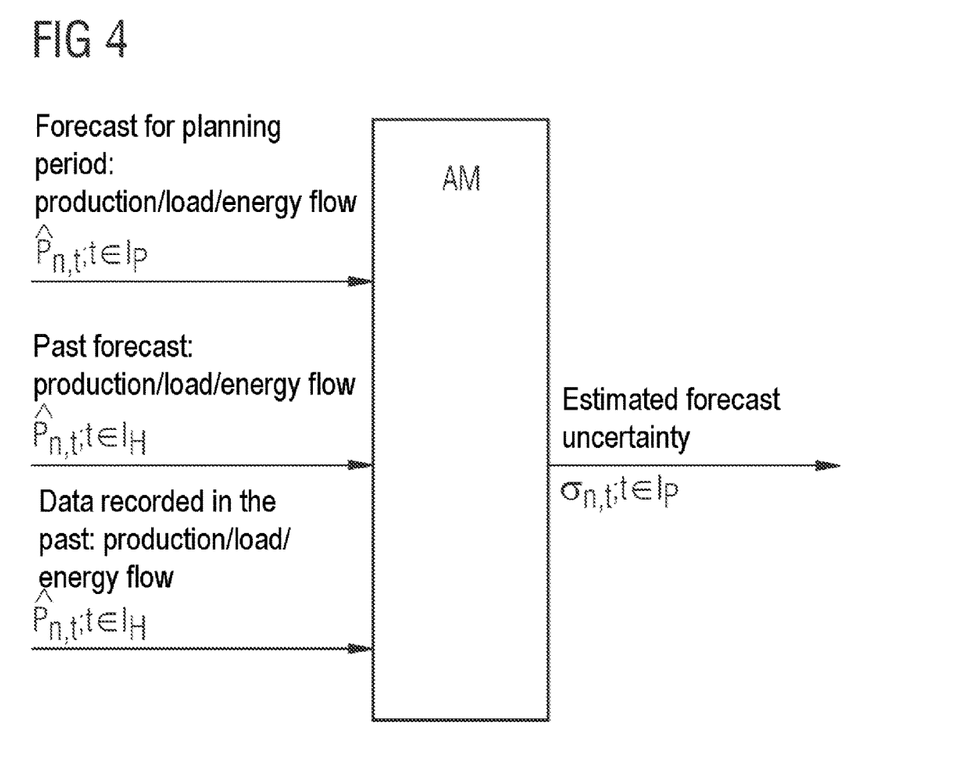
FIG. 4 depicts an example forecast analysis module according to FIG. 1.

FIG. 4 depicts an example of a forecast analysis module PSA. The forecast analysis module PSA estimates the uncertainty of the forecast energy profile. The estimate is carried out by assessing the forecast power based on past data.

FIG. 4 further depicts the forecast analysis module PSA with input and output data. The module uses past forecasts n, t; t∈IH with the same forecast offset, data recorded in the past Pn, t; t∈IH and forecasts n, t; t∈IP for the forecast or planning period.

The output is the uncertainty of the forecast σn, t; t∈IP that is defined, for example, as the variance of a Gaussian distribution model.

The current forecast n, t; t∈IP is used because of correlations between the uncertainty and the actual scale of the energy supply. If, for example, photovoltaic energy production is forecast, the correctness of the forecast is better for very large and very small forecast energies. Since the current energy flows in the planning period are unknown at the time of the forecast, the forecast energies are used.

The forecast uncertainty may be estimated according to the acts stated below.

The forecast energy profile is assigned to a class V in a finite group of classes. The group of classes may be, for example, for the energy flow: V=1 (weak), V=2 (moderate) and V=3 (strong). The classification is obtained from a bundling algorithm that is trained with past forecasts.

The uncertainty is assessed as the standard deviation of the past forecasts in the same class (e.g., with the same planning offset) from the data recorded in the past.

Figure 5:
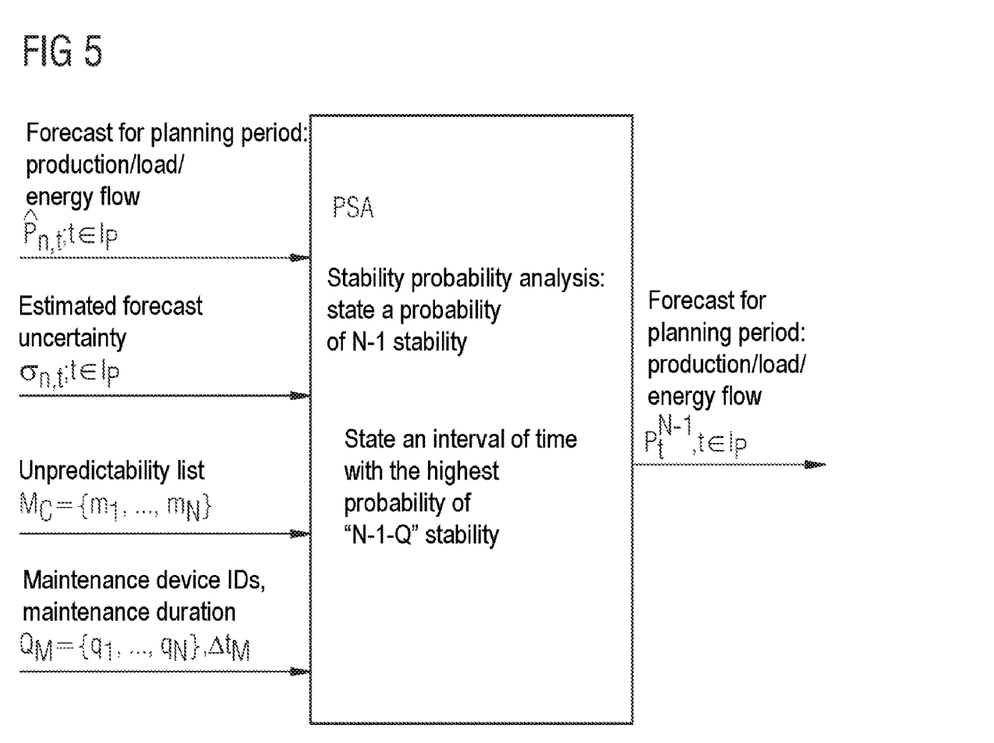
FIG. 5 depicts an example stability probability analysis module according to FIG. 1.

FIG. 5 depicts a stability probability analysis module PSA that uses the results obtained from the modules described above. The forecast analysis module PSA uses the results to determine the probability of N-1 stability for the distribution network. A Gaussian model, for example, is assumed for the uncertainty. For the probability of an energy flow k∈K at a time t, it is assumed, for example:

$$p_{k,t}(P) = N(P|\hat{P}_{k,t}, \sigma_{k,t}^2) = \frac{1}{\sqrt{2\pi\sigma_{k,t}^2}} e^{-\frac{(p-\beta_{k,t})^2}{2\sigma_{k,t}^2}} \quad \text{EQUATION 1}$$

The probability of the N-1 stability is determined by numerical iteration of the state distributions in equation 1 that creates a forecast for the planning period. Based on the uncertainty model according to equation 1, a state vector is depicted with the quantified uncertainty. The state is indexed by an iteration index ξ=1, . . . , NSample. A stability calculation is carried out using an unpredictability list with either the result Xξ=1; ξ=1, . . . , NSample (there is stability) or the result Xξ=0; ξ=1, . . . , NSample (there is no stability). This is repeated NSample times. The probability of stability is given as
$N_{Sample}$.

$$p_{t,stable} = \Sigma_{\xi=1} \cdot X_\xi / N_{Sample}$$

Maintenance work in the distribution network requires components of the distribution network to be disconnected for a predefined period. For the scheduling of the maintenance work, the maintenance times are determined in the planning period so that the greatest probability of a stable state under the disconnection conditions or maintenance conditions exists at the maintenance times. The periods are determined, for example, in the following manner. The N-1 stability is determined according to acts above for each period of a distribution network configuration in which the maintenance devices QM (e.g., the devices to be maintained) have been removed from the system in terms of safety. The determination results in a sequence of probabilities pt,stable for the distribution network under maintenance conditions with N-1 stability. The associated probability of the presence of a stable distribution network over the entire maintenance period may be determined, for example, according to the following functional relationship:

$$p_{comp.,t,\Delta t_M} = \Pi_{t'=t}^{t'=t+\Delta t_M} p_{t',stable} \quad \text{EQUATION 2}$$

The periods that have the highest associated probability of the presence of a stable distribution network under maintenance conditions for the entire maintenance period are selected. The starting time of the maintenance work is determined, for example, according to the following functional relationship:

$$t_{start} = \underset{t}{\operatorname{argmin}}\, p_{comp.,t,\Delta t_M} \quad \text{EQUATION 3}$$

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A device for probability forecasts, the device comprising:
   a data provider configured to provide data relating to forecasts;
   at least one forecaster connected to the data provider and configured to provide forecasts for a planning period;
   a forecast analyzer connected to the at least one forecaster and configured to access past forecast data and past recorded system data, the forecast analyzer configured to calculate estimated forecast uncertainties from the past forecast data and past recorded system data; and
   a stability probability analyzer connected to the at least one forecaster analyzer and configured to access and analyze the estimated forecast uncertainties from the forecast analyzer, an unpredictability list containing unpredictabilities, and information relating to maintenance durations for a plurality of devices, the stability probability analyzer further configured to calculate data relating to an N-1 stability for one or more periods in the planning period in which one or more of the devices of the plurality of devices to be maintained have been removed and select a period from the one or more periods with a highest associated probability of the presence of a stable state under disconnection conditions or maintenance conditions.

2. The device of claim 1, wherein the stability probability analyzer is configured to calculate an associated probability of the presence of a stable distribution network over the planning period by calculating for each period of the one or more periods in the planning period a product of a sequence of probabilities of N-1 stability for each maintenance period of a distribution network configuration in which a device to be maintained has been removed for the distribution network under maintenance conditions.

3. The device of claim 1, wherein the stability probability analyzer is further configured to analyze the estimated forecast uncertainties from weather data.

4. The device of claim 2, wherein the stability probability analyzer is further configured to analyze the estimated forecast uncertainties from weather data.

5. An energy transmission, energy distribution, or energy transmission and energy distribution system comprising:
   a plurality of data provision devices configured to provide data relating to future network states;
   at least one forecaster connected to the plurality of data provision devices and configured to provide forecasts for a planning period from data provided by the plurality of data provision devices;
   a forecast analyzer connected to the at least one forecaster and configured to access past forecast data and past recorded system data, the forecast analyzer configured to calculate estimated forecast uncertainties from the past forecast data and past recorded system data;
   a stability probability analyzer connected to the at least one forecaster and configured to analyze the estimated forecast uncertainties from the forecast analyzer, an unpredictability list containing unpredictabilities, and information relating to maintenance durations, the stability probability analyzer configured to calculate data relating to an N-1 stability for one or more periods in the planning period in which one or more of the devices of the plurality of devices to be maintained have been removed and select a period from the one or more periods with a highest associated probability of the presence of a stable state under disconnection conditions or maintenance conditions; and
   a network control system connected to the least one forecaster and configured to change the energy transmission and/or energy distribution network to a current operating state.

6. The energy transmission, energy distribution, or energy transmission and energy distribution system of claim 3, wherein the stability probability analyzer is configured to calculate an associated probability of the presence of a stable distribution network over the planning period by calculating for each period of the one or more periods in the planning period a product of a sequence of probabilities of N-1 stability for each maintenance period of a distribution network configuration in which a device to be maintained has been removed for the distribution network under maintenance conditions.

7. The system of claim 5, wherein the stability probability analyzer is further configured to analyze the estimated forecast uncertainties from weather data.

8. The system of claim 6, wherein the stability probability analyzer is further configured to analyze the estimated forecast uncertainties from weather data.

9. A method for operating an energy transmission, energy distribution, or energy transmission and energy distribution network, the method comprising:
   providing data for forecasting future network sites for a planning period, the data including forecasts, past forecasts, and past recorded system data;
   calculating estimated forecast uncertainties from the forecasts, past forecasts, and past recorded system data;
   analyzing forecasts, the estimated forecast uncertainties, unpredictabilities and information relating to network maintenance devices and maintenance durations;
   determining from the analysis, at least one item of information relating to an N-1 stability of the energy transmission, energy distribution, or energy transmission and energy distribution network in one or more periods in the planning period in which one or more of the devices of the plurality of devices to be maintained have been removed; and
   selecting a period from the one or more periods with a highest associated probability of the presence of a stable state under disconnection conditions or maintenance conditions.

10. The method of claim 9, further comprising:
    determining from the analysis an associated probability of the presence of a stable distribution network over the planning period by calculating for each period of the one or more periods in the planning period a product of a sequence of probabilities of N-1 stability for each maintenance period of a distribution network configuration in which a device to be maintained has been removed for the distribution network under maintenance conditions.

11. The method of claim 9, wherein analyzing further comprises analyzing weather data.

12. The method of claim 10, wherein analyzing further comprises analyzing weather data.

* * * * *